UNITED STATES PATENT OFFICE.

JOHN W. McLANE, OF WASHINGTON, DISTRICT OF COLUMBIA.

PROCESS FOR PREPARING DRIED SWEET CORN.

1,297,204. Specification of Letters Patent. Patented Mar. 11, 1919.

No Drawing. Application filed April 2, 1918. Serial No. 226,301.

*To all whom it may concern:*

Be it known that I, JOHN W. McLANE, a citizen of the United States of America, and an employee of the Department of Agriculture of the said United States, residing at Washington, in the District of Columbia, (whose post-office address is Department of Agriculture, Washington, D. C.,) have invented a new and useful Process for Preparing Dried Sweet Corn.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

The object of my invention is to provide a process whereby dried sweet corn may be satisfactorily prepared for table use.

In carrying out my process, I secure sweet corn, boil it as for immediate table use, and then allow the cooked material to cool. When the cooling operation is over, I remove the whole grains of corn from the cob and dry them in any suitable manner, and after completing the drying operation I pass the shelled corn through a coarse grinder of any appropriate type for the purpose of dividing the individual grains into small parts of various sizes. The grinding of the shelled corn, which has been previously cooked and dried in the manner outlined, operates to separate from the body of the grain its outer coating. I effect the removal of the coating from the ground grain by subjecting the ground material to the action of air current immediately upon the the completion of the grinding operation. From investigations and tests which I have made, I find that, if the grains of cooked and dried corn are properly ground along the lines hereinbefore outlined, and the ground material is fanned by a current of air, the air will effectively remove the coating from the grain fragments.

I have found from investigations that sweet corn prepared in accordance with the process herein above outlined is more palatable and digestible than dried sweet corn retaining its outer coating.

Having thus described my invention, I claim:

A process for preparing dried sweet corn for table use consisting in boiling sweet corn on the cob, removing the whole grains of corn from the cob, drying the grains of corn so removed, grinding the shelled corn, and subjecting the ground material to the action of air current for effecting the removal of the coating or outer layer of the corn.

In witness whereof, I affix my signature in the presence of two subscribing witnesses.

JOHN W. McLANE.

Witnesses:
G. L. HOFFMAN,
THOMAS SHAW.

Copies of this patent may be obtained for five cents each, by addressing the "Commissioner of Patents, Washington, D. C."